United States Patent
Su

[19]

[11] Patent Number: 6,044,143
[45] Date of Patent: Mar. 28, 2000

[54] NON-NOTIFIED CENTRALIZED OPERATOR IN PRIVATE TELECOMMUNICATION NETWORK

[75] Inventor: Kao-Ping Mike Su, Brea, Calif.

[73] Assignee: Ericsson Inc., Research Triangle Park, N.C.

[21] Appl. No.: 08/918,114

[22] Filed: Aug. 27, 1997

[51] Int. Cl.[7] .......................... H04M 1/64; H04M 3/527; H04M 3/54
[52] U.S. Cl. .......................... 379/225; 379/211; 379/232
[58] Field of Search .................................. 379/211, 219, 379/220, 221, 225, 232

[56] References Cited

U.S. PATENT DOCUMENTS 5,018,194  5/1991  Suzuki et al. .......................... 379/207
5,253,288  10/1993  Frey et al. .......................... 379/221

*Primary Examiner*—Harry S. Hong
*Attorney, Agent, or Firm*—Jenkens & Gilchrist, P.C.

[57] ABSTRACT

A method for transmitting calls between interconnected PBX systems within a private telephone network is disclosed. An initial call connection request is generated at an originating PBX system to a destination PBX system. The call connection request includes an indication of a specific destination number which may answer a call to the exclusion of any other destination number. If the specific destination number may not answer the call, the originating PBX system is notified of the call connection failure and the originating PBX accesses a pre-generated listing of alternate call destinations. Call connection then proceeds to one of the alternate destinations.

10 Claims, 3 Drawing Sheets

NON-NOTIFIED CENTRALIZED OPERATOR IN PRIVATE TELECOMMUNICATION NETWORK

BACKGROUND OF THE INVENTION

1. Technical Field of the Invention

The present invention relates to interconnection of a number of private branch exchange (PBX) systems, and more particularly, to communications between PBX systems that do not require day/night notifications to enable efficient call transfer from one PBX to another.

2. Description of Related Art

One manner in which PBX systems provide flexible and effective operator service is through the use of a centralized operator function and a day/night status notification function. These functionalities enable a satellite PBX to know the status of attached central PBXS. The day/night status notification function provides the satellite PBX with a notification of whether a central PBX is in the day or night operational status.

During the day status, the central PBX is opened to receive calls and has human operators in place such that any call which is redirected from a satellite PBX may be completed. The night status indicates that the central PBX is presently not manned by a human operator. Thus, calls to numbers served by the satellite PBX shall not be redirected to the central PBX. The day/night status notification function within the central PBX notifies the satellite PBX of the status of the central PBX and the satellite PBX can refer to this information to select a new destination for directing calls of the satellite PBX while it remains in night status.

The centralized operator function of a PBX system requires the support of the day/night status notification functions from the central PBXs in order to know the status of the various PBXs to which a satellite PBX is connected. In order to synchronize the day/night status data between the central and satellite PBXs, periodic notifying and updating are necessary. However, within a large private network, a central PBX may limit the number of satellite nodes which it notifies of its own day/night status in order to prevent adverse affects upon the private telecommunication network's overall performance.

Also, no matter how often the notification is executed, there always exist a window between the time the status of a central PBX changes and the satellite PBX is notified. The situation may occur where a call is transferred from a satellite PBX to a central PBX whose status may have just changed. A method for eliminating the possibility of improper call connection attempts to PBX systems and for limiting housekeeping communications between PBX systems would be a very valuable improvement for PBX systems.

SUMMARY OF THE INVENTION

The present invention comprises a method and apparatus enabling transmission of calls between a number of interconnected PBX systems within a private telephone network. A function within a first PBX system generates a call connection request from the first PBX system to a specific destination number within a second PBX system. The call connection request includes an indication of the specific destination number which must answer the call such that the second PBX shall not attempt to forward the call to an alternate destination if the specific destination number cannot answer the call.

If completion of the call to the specific destination number is not possible, the first PBX is notified of the incomplete call connection. The first PBX searches a listing containing alternate destination numbers for the originally transmitted call connection request and attempts to contact one of the alternate destination numbers in a similar manner. Routing of the call connection request is controlled solely by the call itself and may not be routed by the destination PBX or associated circuitry.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
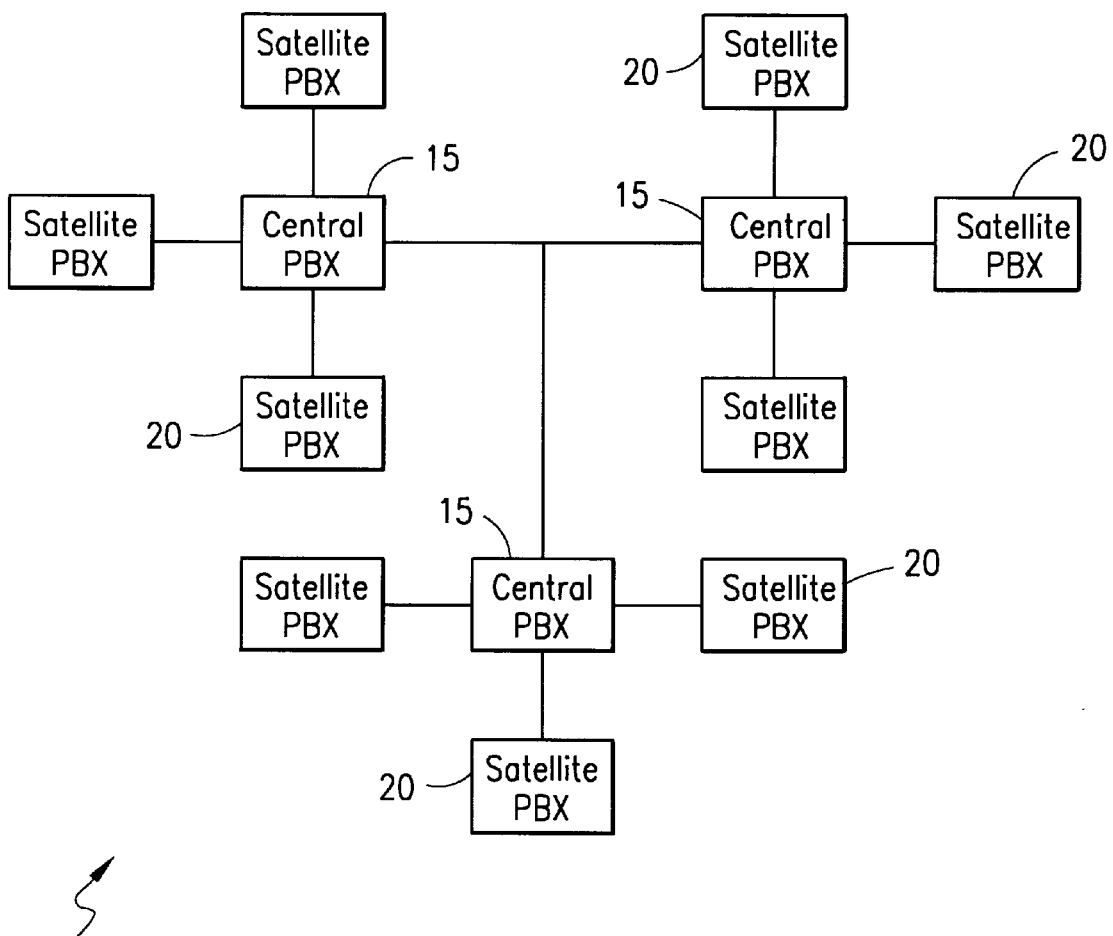
FIG. 1 is a block diagram illustrating a private telephone network including a plurality of central PBX systems and satellite PBX systems.

Referring now to the drawings, and more particularly to FIG. 1, there is illustrated a private telephone network 10. The private telephone network 10 consists of a number of central PBX systems 15 which act as interconnecting nodes for a plurality of satellite PBX systems 20. The satellite PBX systems 20 may be connected to a single or multiple central PBX systems 15. As discussed previously, the ability of a satellite PBX system 20 to communicate with another satellite PBX system or central PBX system 15 is based upon a knowledge of whether a call request for operator service can be routed through its own or another central PBX system. This notification is presently provided by the day/night notifications between various PBX systems. The day/night status notifications are generated from a central PBX system 15 to a satellite PBX system 20, such that the satellite PBX system knows if the central PBX system has human operators in place. The notification may be implemented by either a query/respond system or a simple notification mechanism.

Figure 2:
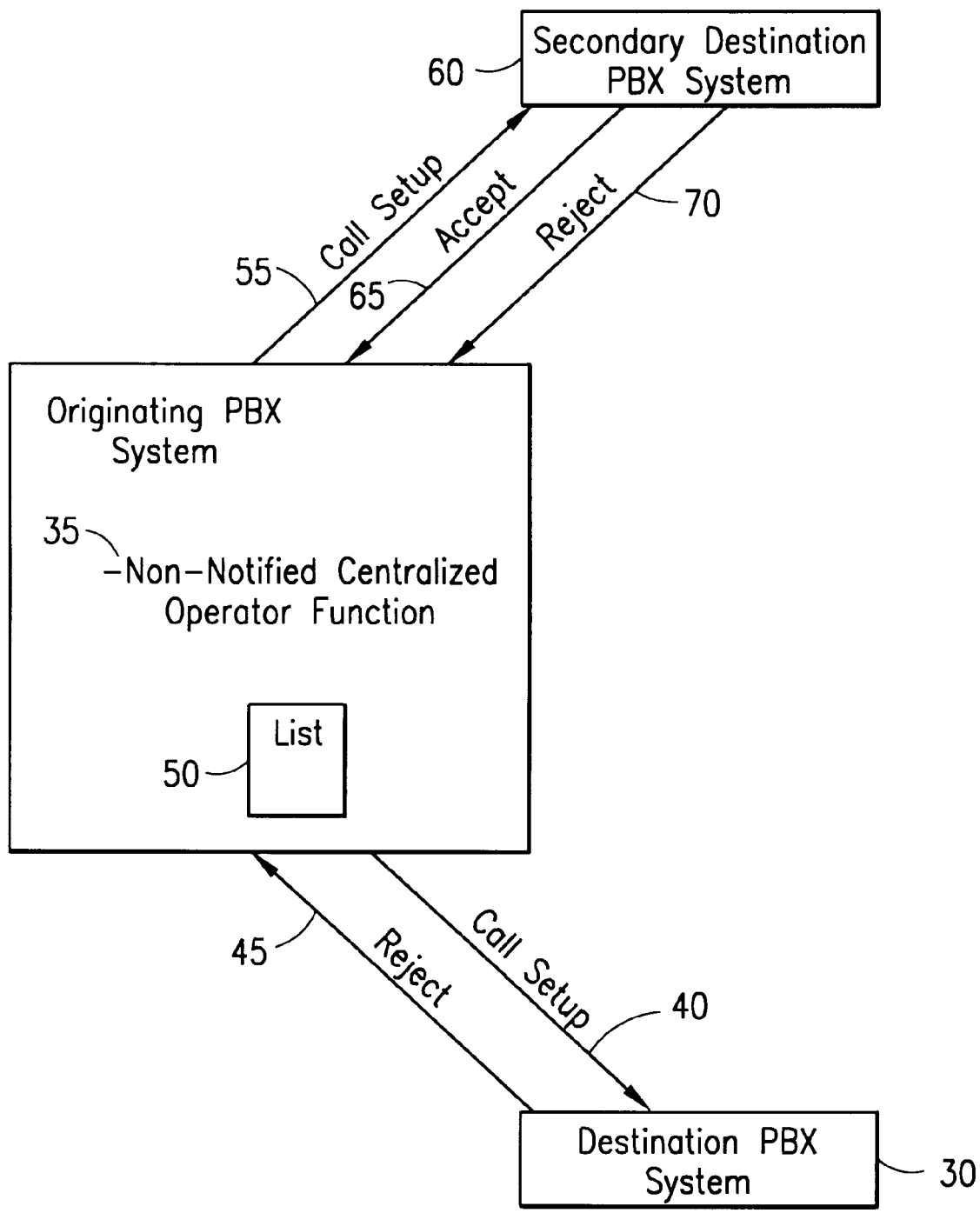
FIG. 2 illustrates communications between a PBX system initiating a Call Connection Request and a primary and secondary call destinations.

Referring now to FIG. 2, there is illustrated the improved method of the present invention whereby an originating PBX system 25 which may comprise a satellite or central PBX system communicates with a destination PBX system 30 using a method that does not rely upon a day/night notification feature. In this method a non-notified centralized operator function 35 residing within the originating PBX system 25 generates a Call Connection Request 40 to a destination number at a desired destination PBX system 30. The Call Connection Request 40 includes a restriction indicating a destination number which is the only number that can answer the call. If the call cannot be answered by the specified destination number, the destination PBX system 30 notifies the originating PBX system 25 that the call cannot be completed. The restriction to the specified destination number is a characteristic of the Call Connection Request and not of the destination number.

Upon receipt of a rejection 45, the originating PBX system 25 utilizes the non-notified centralized operator function 35 to access a list 50 of alternate destination numbers. The list 50 of alternate destination numbers can be programmed per PBX, per call destination number, or in a combination thereof. The non-notified centralized operator function 35 selects a next answering location from the pregenerated list 50 and initiates a new Call Connection Request 55 to a secondary destination PBX system 60. As before, the Call Connection Request 55 includes a restriction as to the destination number which may answer the call. If the call is answered at the secondary location, an acceptance 65 is transmitted to the originating PBX system 25 and call setup is completed. If the call cannot be answered at the secondary destination number, a rejection 70 is transmitted to the originating PBX system, and a next destination is selected from the list 50 as described previously.

Figure 3:
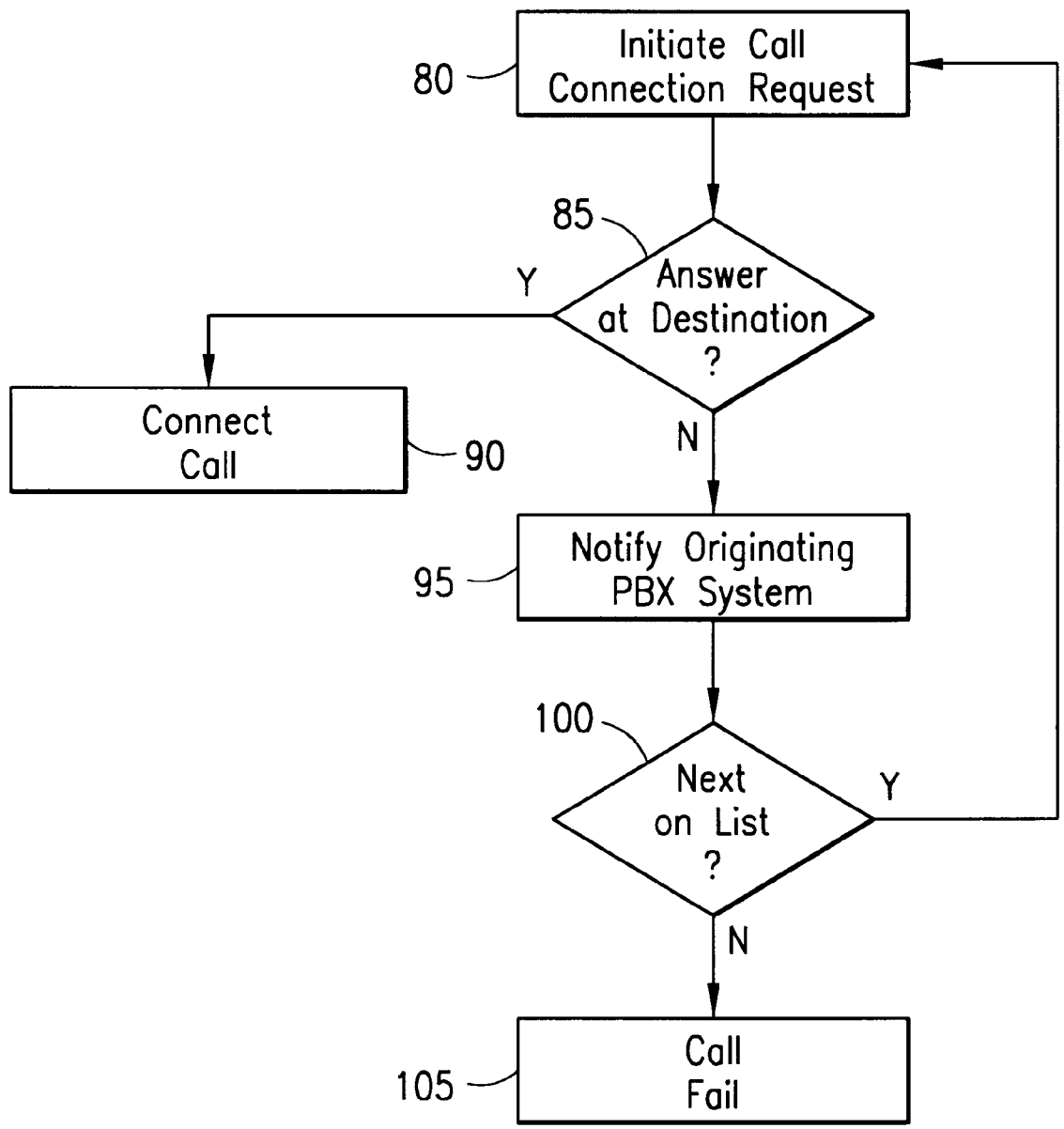
FIG. 3 is a flow diagram illustrating the call setup procedure of the present invention.

Referring now to FIG. 3, there is a flow diagram describing the method of the present invention. A Call Connection Request is initiated at step 80 from the originating PBX system to the destination PBX system. Inquiry step 85 determines if the destination number associated with the Call Connection Request can answer the incoming call. If so, the call is connected at step 90.

If the call cannot be answered by the destination number, the destination PBX system notifies the originating PBX system that the call cannot be completed at step 95. The originating PBX system then accesses the alternate number list at inquiry step 100 to determine whether there exist an alternate location to send the call connection request to. If so, the alternate number is returned and control passes back to step 80 to initiate a new Call Connection Request using the new number. If an alternate number does not exist, connection of the call fails at step 105.

Thus, the non-notified centralized operator feature enables a satellite PBX system to redirect calls to an answering position and a non-notified PBX. If the call cannot be answered by the called party, the call will be rejected. The satellite (originating) PBX can then attempt to forward the call to the next choice of preprogrammed answering positions.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for transmitting calls between interconnected PBX systems within a private telephone network, comprising the steps of:
   a) generating a call connection request from a first PBX system to a second PBX system, the call connection request including an indication of a specific destination number allowed to answer the call, the indication preventing the second PBX from forwarding the call to an alternate destination number; and
   b) notifying the first PBX system if the specific destination number cannot answer the call.

2. The method of claim 1 further including the step of selecting an alternate destination number from a list of destination numbers if the first PBX is notified the specific destination number cannot answer the call.

3. The method of claim 2 further including the step of repeating steps a) and b) using the alternate destination number.

4. The method of claim 1 further including the step of rejecting the call connection request by the second PBX if the specific destination number cannot answer the call.

5. A method for transmitting calls between interconnected PBX systems within a private telephone network, comprising the steps of:
   a) generating a call connection request from a first PBX system to a second PBX system, the call connection request including an indication of a specific destination number allowed to answer the call, the indication preventing the second PBX from forwarding the call to an alternate destination number;
   b) preventing forwarding of the call to the alternate destination number responsive to the indication of the specific call destination number;
   c) notifying the first PBX system if specific destination number cannot answer the call;
   d) selecting an alternate destination number from a list of destination numbers stored at the first PBX system if the first PBX system is notified the specific destination number will not answer the call; and
   e) generating a call connection request from the first PBX system to the second PBX system, the call connection request including an indication of a second specific destination number selected from the list which must answer the call to the exclusion of any other destination number.

6. The method of claim 5 further including the step of rejecting the call connection request by the second PBX system if the specific destination number cannot answer the call.

7. A PBX system interconnected with a plurality of other PBX systems, comprising:
   a list containing a plurality of destination numbers to which to direct a call connection request if a previous call connection request fails; and
   means for generating a call connection request to a selected destination number from the plurality of destination numbers within the list, the generated call connection request including an indication of an inability to forward the call from the selected destination number if the call may not be completed to the selected destination number.

8. The PBX system of claim 7 wherein the list is uniquely programmed for the PBX system.

9. The PBX system of claim 7 wherein the list is uniquely programmed per called destination number.

10. The PBX system of claim 7 wherein the list is uniquely programmed according to the PBX system and a called destination number.

\* \* \* \* \*

UNITED STATES PATENT AND TRADEMARK OFFICE
CERTIFICATE OF CORRECTION

PATENT NO  : 6,044,143
DATED      : March 28, 200
INVENTOR(S): Kao-Ping Mike Su

It is certified that error appears in the above-identified patent and that said Letters Patent are hereby corrected as shown below:

Column 1, line 18        Replace "S"
                         With --s--

Signed and Sealed this

Tenth Day of April, 2001

NICHOLAS P. GODICI

Attest:

Attesting Officer        Acting Director of the United States Patent and Trademark Office